United States Patent
Ayers (10) Patent No.: US 7,793,224 B1
(45) Date of Patent: Sep. 7, 2010

(54) METHODS AND APPARATUS FOR FORMATTING IDENTIFIED CONTENT

(75) Inventor: Robert M. Ayers, Palo Alto, CA (US)

(73) Assignee: Adobe Systems Inc., San Jose, CA (US)

( * ) Notice: Subject to any disclaimer, the term of this patent is extended or adjusted under 35 U.S.C. 154(b) by 429 days.

(21) Appl. No.: 11/087,018

(22) Filed: Mar. 22, 2005

(51) Int. Cl.
G06F 17/21 (2006.01)

(52) U.S. Cl. ..................... 715/770; 715/256; 715/249; 715/769

(58) Field of Classification Search ................. 715/530, 715/531, 523, 522, 769, 770, 235, 236, 249, 715/255, 256, 246

See application file for complete search history.

(56) References Cited

U.S. PATENT DOCUMENTS

| | | | | |
|---|---|---|---|---|
| 5,897,650 | A * | 4/1999 | Nakajima et al. | 715/539 |
| 6,023,714 | A * | 2/2000 | Hill et al. | 715/235 |
| 6,177,939 | B1 * | 1/2001 | Blish et al. | 715/770 |
| 6,240,430 | B1 * | 5/2001 | Deike et al. | 715/539 |
| 6,272,505 | B1 * | 8/2001 | De La Huerga | 715/235 |
| 6,886,133 | B2 * | 4/2005 | Bailey et al. | 715/531 |
| 6,944,821 | B1 * | 9/2005 | Bates et al. | 715/209 |
| 6,968,504 | B2 * | 11/2005 | Broman et al. | 715/531 |
| 7,293,242 | B2 * | 11/2007 | Cossey et al. | 715/770 |
| 7,373,603 | B1 * | 5/2008 | Yalovsky et al. | 715/255 |
| 7,461,349 | B1 * | 12/2008 | Sharma et al. | 715/770 |
| 7,624,353 | B2 * | 11/2009 | Beumer | 715/764 |
| 2003/0177449 | A1 * | 9/2003 | Rose | 715/530 |
| 2004/0060000 | A1 * | 3/2004 | Jaeger | 715/502 |
| 2004/0070622 | A1 * | 4/2004 | Cossey et al. | 345/769 |
| 2004/0088653 | A1 * | 5/2004 | Bell et al. | 715/523 |
| 2004/0172584 | A1 * | 9/2004 | Jones et al. | 715/500 |
| 2005/0091603 | A1 * | 4/2005 | Chen et al. | 715/769 |

OTHER PUBLICATIONS

Microsoft, Word 2003 Screen Shots, Dec. 31, 2003, pp. 1-6.*

* cited by examiner

*Primary Examiner*—Adam L Basehoar
(74) *Attorney, Agent, or Firm*—Chapin IP Law, LLC (57) ABSTRACT

A content formatting process receives identification of selected content within an original document, and identifies formatting information associated with the selected content, but not contained within the selected content. The identified formatting information is applied to the selected content when the selected content is copied to a revised document. During the content formatting process, the original document is scanned to identify formatting characters within the document. The various types of formatting identified by the content formatting process are presented to the user, and the user is prompted to choose which types of formatting should be applied to a new, revised document. The content formatting process receives the selection(s) of the formatting types, from the user, and the chosen formatting types are applied to the selected content in the new, revised document.

7 Claims, 6 Drawing Sheets

200 RECEIVE AT LEAST ONE IDENTIFICATION OF CONTENT IN AN ORIGINAL DOCUMENT

201 RECEIVE AN IDENTIFICATION OF RETAINED CONTENT TO BE RETAINED WITHIN THE DOCUMENT

202 RECEIVE AN IDENTIFICATION OF NON-CONTIGUOUS PORTIONS OF CONTENT FROM THE ORIGINAL DOCUMENT THAT COLLECTIVELY FORM THE RETAINED CONTENT

OR

203 RECEIVE A SELECTION OF THE RETAINED CONTENT VIA A SELECTION MECHANISM OPERATING IN A GRAPHICAL USER INTERFACE

204 RECEIVE AN IDENTIFICATION OF REMOVED CONTENT TO BE REMOVED FROM VIEW IN THE DOCUMENT, THE REMOVED CONTENT BEING DIFFERENT THAN THE RETAINED CONTENT

205 RECEIVE A SELECTION OF THE REMOVED CONTENT VIA A SELECTION MECHANISM OPERATING IN A GRAPHICAL USER INTERFACE, THE RETAINED CONTENT BEING CONTENT NOT SELECTED DURING RECEIVING AN IDENTIFICATION OF REMOVED CONTENT

*FIG. 3*

206 IDENTIFY, WITHIN THE ORIGINAL DOCUMENT, FORMATTING INFORMATION THAT IS ASSOCIATED WITH THE IDENTIFIED CONTENT

> 207 IDENTIFY FORMATTING INFORMATION THAT IS PRESENTLY APPLIED TO THE IDENTIFIED CONTENT
>
>> 208 IDENTIFY FORMATTING INFORMATION THAT IS ASSOCIATED WITH THE IDENTIFIED CONTENT BUT THAT IS DEFINED IN A LOCATION OTHER THAN A LOCATION OF THE IDENTIFIED CONTENT WITHIN THE ORIGINAL DOCUMENT
>>
>>> 209 IDENTIFY FORMATTING INFORMATION THAT IS LOCATED IN A DOCUMENT OTHER THAN THE ORIGINAL DOCUMENT

OR

206 IDENTIFIES, WITHIN THE ORIGINAL DOCUMENT, FORMATTING INFORMATION THAT IS ASSOCIATED WITH THE IDENTIFIED CONTENT

> 210 IDENTIFY FORMATTING INFORMATION THAT IS PRESENTLY FORMATTING OTHER CONTENT IN THE ORIGINAL DOCUMENT, THE OTHER CONTENT BEING DIFFERENT THAN THE IDENTIFIED CONTENT
>
>> 211 IDENTIFY FORMATTING INFORMATION THAT IS PRESENTLY FORMATTING CONTENT IN THE ORIGINAL DOCUMENT EXCLUSIVE OF THE IDENTIFIED CONTENT
>>
>> OR
>>
>> 212 IDENTIFY THE OTHER CONTENT AS PART OF THE FORMATTING INFORMATION

206 IDENTIFY, WITHIN THE ORIGINAL DOCUMENT, FORMATTING INFORMATION THAT IS ASSOCIATED WITH THE IDENTIFIED CONTENT

220 SCAN A SOURCE VERSION OF THE ORIGINAL DOCUMENT TO IDENTIFY HIDDEN DOCUMENT FORMATTING CHARACTERS ASSOCIATED WITH TYPES OF FORMATTING OF THE CONTENT CONTAINED IN THAT ORIGINAL DOCUMENT

221 SELECT, AS THE IDENTIFIED FORMATTING INFORMATION, HIDDEN DOCUMENT FORMATTING CHARACTERS THAT ARE RELEVANT TO THE IDENTIFIED CONTENT, AT LEAST SOME OF THE HIDDEN DOCUMENT FORMATTING CHARACTERS IDENTIFIED AS FORMATTING INFORMATION BEING DEFINED IN A LOCATION OTHER THAN A LOCATION OF THE IDENTIFIED CONTENT WITHIN THE ORIGINAL DOCUMENT

222 SELECT HIDDEN DOCUMENT FORMATTING CHARACTERS THAT CORRESPOND TO FORMATTING TO BE APPLIED TO A PARAGRAPH CONTAINING THE IDENTIFIED CONTENT

*FIG. 6*

METHODS AND APPARATUS FOR FORMATTING IDENTIFIED CONTENT

BACKGROUND

Conventional document editors, such as word processors, web page editors and text editors enable users to quickly create properly formatted documents, using "What You See Is What You Get" (WYSIWYG) technology. As the document is created, the user can apply formatting options (i.e. paragraph style, line spacing, indent spacing, case style, etc) to the document in individual sections of the document, or propagate those formatting options to the entire document, enabling the user to view the formatted document content immediately. Conventional document editors typically format documents by inserting special tags (both visible and invisible) into the document content that gets saved with the document content and applied to the content when the content is rendered (e.g. printed on paper or displayed on a screen). The tags thus structure the appearance of the document content that a user sees.

Most conventional document editors also allow users to select a portion of the document content (i.e. 'cut'), and move the selected portion of content to a different location either within the document, or into a separate document (i.e. 'cut and paste'). Conventional document editors also allow users to select a portion of the document (i.e. 'copy') and copy the selected portion to a different location either within the document, or into a separate document, while retaining the selected portion in its original position within the document (i.e. 'copy and paste').

SUMMARY

Conventional technologies for document editing suffer from a variety of deficiencies. In particular, conventional technologies in document editors for document editing that allow users to select portions of the document content to be transferred to another document, or another area of the original document, are limited to transferring over (i.e. copying or moving) only the selected portion of content along with certain formatting information contained within the selected portion of content. In many cases, conventional document editing logic built into conventional document editing systems (e.g. software applications) does not transfer certain formatting information that is contained within the original document that is related to the selected content, but that is contained within another area of the document that is different from the user's selected portion of content. For example, suppose a user chooses to cut a section of a document, and paste that section into a new document. To do so, the user highlights the section, and then performs the 'copy' function, selecting that portion of the document for placement into a buffer. The user then chooses the area, either within the original document, or within the new document, where the selected portion of the document should be inserted or 'pasted'. This is usually done by navigating a cursor or pointing device to another region of the document (or in a new or different document) where the selected portion is to be placed. When the selected portion is inserted, or 'pasted' into the destination area of a document using conventional editing logic, the selected portion contains only the text and any formatting information that was directly contained within the selected portion. The pasted content does not contain any formatting information pertaining to the selected portion that may have been contained within the original document, but that was outside of the area of the selected portion in that original document content.

As a specific example, the selected portion of the document may contain formatting information (e.g. invisible tags) for the text that exists within the selected portion that is bolded, underlined or italicized. However, the selected portion of the document content might not contain paragraph formatting information, such as spacing between lines, or indentation information for the first line of the paragraph, since the paragraph formatting information is located at the beginning and/or end of the paragraph from which the highlighted selected portion of content was chosen. In other words, the paragraph formatting information was not part of or contained within the selected portion of content that the user highlighted. As a result, the overall paragraph formatting information is lost when the user copies a small part of a paragraph (e.g. a sentence or two) to another region of the same or a different document. As a result, the user will have to perform the formatting steps again on the content within the new document to have this pasted content obtain the proper paragraph formatting.

Embodiments disclosed herein significantly overcome such deficiencies and provide a system that includes a computer system executing a content formatting process that identifies formatting information pertaining to a selected portion of a document, even if the formatting information resides outside of the selected portion of the document. As an example, the formatting information in a document that the system disclosed herein can identify may also include page layout information, such as text laid out in columns, content with sidebars and/or with captions or with any other type of formatting that can be page-wide. Importantly, this content may be located in or may span an area of the document that is not the same area or is greater than the area or region containing the identified (e.g. user selected) content. This formatting information may define document properties that are generic and global to the overall content or document, or to large portions of the document other than just the identified content region. The system associates the identified formatting information with the selected portion so that, for example, if the selected portion of the document is pasted or copied elsewhere, the formatting information that resided somewhere in the document data, possibly outside of the region containing the selected portion, is still applied to the selected portion (i.e. once pasted elsewhere). For example, if a user uses the system to copy some content from a "sidebar" portion of a document to a page in another document (or into a new document) that lacks a sidebar, then in one example configuration, the system disclosed herein carries over the sidebar formatting and formats the layout column(s) in the revised (i.e. new) document narrower to make room for the identified content pasted into the revised document as a sidebar. The pasted content is shown as a sidebar even though the sidebar formatting in the original document may have been defined in a location of the original document that was different than the identified content and that was applicable to content in the original document other than (i.e., in addition to) the identified content.

The system disclosed herein is useful, for example, in situations where a user desires to select many portions of content within a document and then desires to have any remaining unselected portions of content be removed or suppressed from view, while still maintaining any formatting information that may have existed in the non-selected content (i.e. while not suppressing or removing formatting that is relevant to the selected content but that may have existed in a region of the document containing the content to be removed or suppressed).

During an example operation of one embodiment, suppose a user chooses to cut and paste a portion of an original document into a new, revised document. The user highlights a section of the document, and performs the copy function. The content formatting process receives the highlighted selected portion of the document, and identifies the formatting information associated with the selected portion that is highlighted. The identified formatting information may exist within the selected portion, or outside of the selected portion. The identified formatting information may even reside outside of the original document, for example, in a style sheet, that is referenced within the document. The content formatting process applies the identified formatting information to the highlighted selected portion. When the user pastes the highlighted selected portion into a new document, all the formatting information pertaining to the selected portion is carried over into the new document. The user does not have to perform any additional formatting steps to the selected portion in order to have it match the selected portion from the original document.

In one example configuration, the user selects portions of the document the user wishes to retain, and the content formatting process deletes all the non-selected portions of the document. This saves the user the trouble of going through the document, and determining what sections should be deleted, once the user decides which sections should be retained.

In one example, the portions of the document the user selects are the selections of the document for which the content formatting process will identify formatting information.

In one example, the portions of the document the user does not select are the selections of the document for which the content formatting process will identify formatting information.

In one example, the user selects non-contiguous portions of the document. That is, the user is able to 'copy' or select (e.g. highlight) several sections of the document simultaneously and those sections may not be attached to each other, but instead may exists in various other areas within the document.

In one example, the user is selecting content on a web page. The formatting information for that web page may be contained, for example, within a Cascading Style Sheet (CSS) file. In this example, the content formatting process identifies the formatting information associated with the highlighted selected portion by determining that the formatting information is contained within a document different than the document from which the user is selecting content.

In one example, the content formatting process identifies formatting information for both content contained and not contained within the portion selected by the user. The content that is not contained within the portion selected by the user, can itself, be formatting information.

In one example, the content formatting process scans the document for formatting information. The content formatting process might find, for example, character formatting (e.g. character font, character color, etc), paragraph formatting (e.g. spacing between lines, paragraph indentation, etc), and document formatting (e.g. background color, table structure within the document, etc). The user might want some of this formatting information to be transferred to the new document, such as the character formatting, paragraph formatting, and background color, but not other formatting information, such as the table structure within the document where the selected portion of the documents exists. The content formatting process identifies the various types of formatting information, and presents it to the user, prompting the user to determine which formatting information is carried over to the new document when the user performs the past function.

Other embodiments disclosed herein include any type of computerized device, workstation, handheld or laptop computer, or the like configured with software and/or circuitry (e.g. a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g. data structures) arranged or encoded on a computer readable medium such as an optical medium (e.g. CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The features disclosed herein, may be employed in data communications devices and other computerized devices and software systems for such devices such as those manufactured by Adobe Systems Incorporated of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include a content formatting process that receives an identification of content from an original document. As an example, the identified content may be content selected (e.g. highlighted) by a user, or may be content in a document other than the highlighted or selected content (e.g. the user may select those portions that he or she does not want to retain). The content formatting process identifies, within the original document, formatting information that is associated with the identified content. The content formatting process applies the identified formatting information from the original document to the identified content to create a revised document that contains the identified content formatted with the identified formatting information. By specifically identifying formatting information associated with the identified content but that may exist elsewhere in the document other than the region containing the identified content, such formatting information is not lost when the identified content is used (e.g. pasted or otherwise displayed) by itself, or within a new document, or elsewhere in the original document.

In one embodiment, the identified content, whether retained content to be retained or removed content to be removed is received via a selection mechanism operating in a graphical user interface. When the content formatting process identifies, within the original document, formatting information that is associated with the identified content, the content formatting process can identify formatting information that is presently applied to the identified content and/or formatting information that is not directly applied to the content, such as a title of a page, margin settings, header and/or footer information and so forth. That is, the content formatting process identifies formatting information that is presently formatting other content in the original document that is different than the identified content. The content different than the identified content can be exclusive of the identified content, or can be content that identifies the formatting information.

Applications equipped with the content formatting process can include, for example, word processors, web page editors, portable document format (PDF) document editors, software code editors, graphics editors, or the like.

Figure 1:
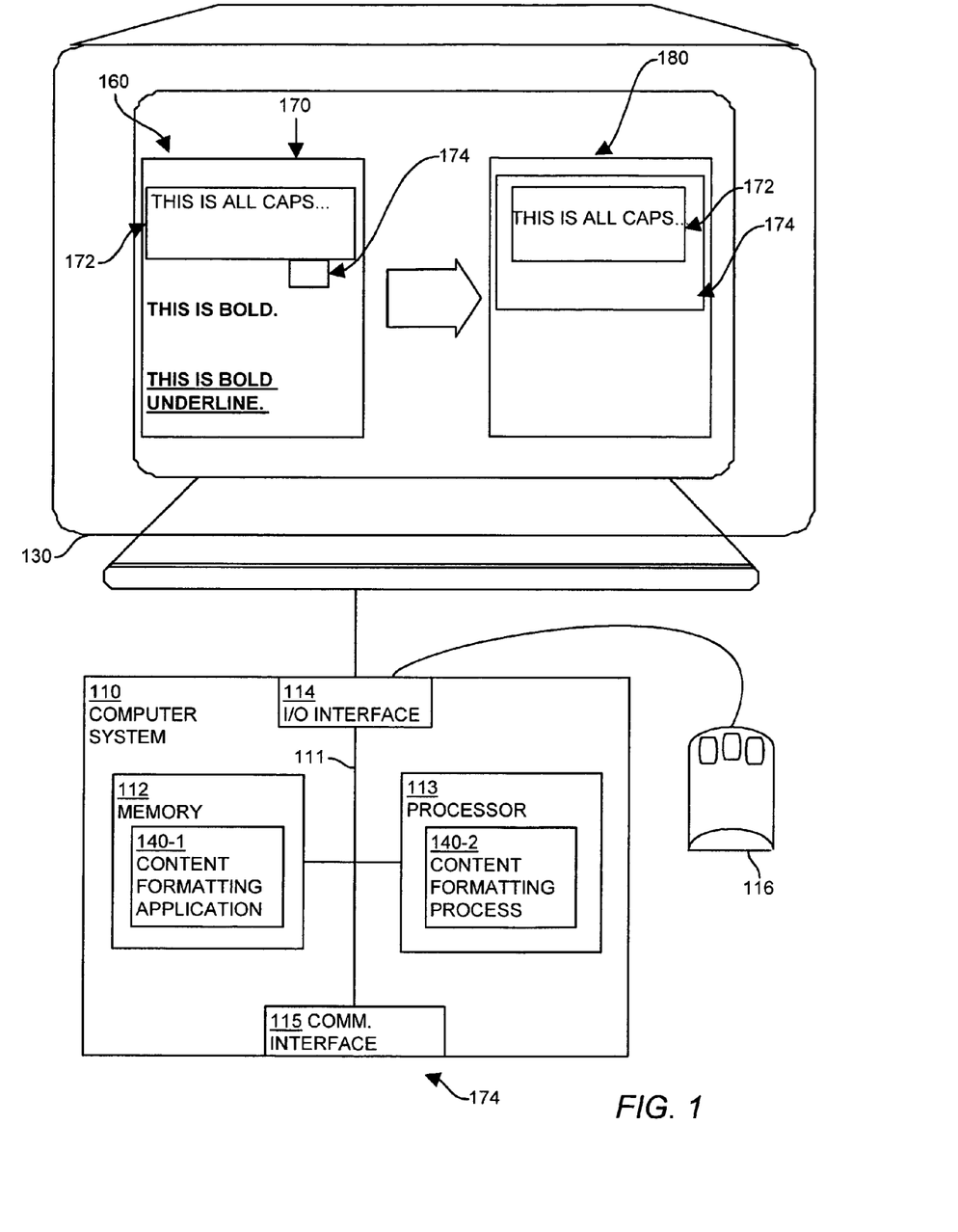
FIG. 1 shows a high level view of a document editor according to one embodiment disclosed herein.

FIG. 1 is a block diagram illustrating example architecture of a computer system 110 that executes, runs, interprets, operates or otherwise performs a content formatting application 140 and process 141. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g. one or more user/developer controlled devices such as a keyboard, mouse, etc.) couples to processor 113 through I/O interface 114, and enables a user to provide input commands and generally control the graphical user interface 160 that the content formatting application 140-1 and process 140-2 provides on the display 130. The graphical user interface 160 displays the original document 170, containing the identified content 172. Formatting information 174 is associated with the identified content 172, and is transferred over to the revised document 180 during the content formatting process 140 as explained herein. The communications interface 115 enables the computer system 110 to communicate with other devices (i.e. other computers) on a network (not shown). This can allow access to the content formatting application by remote computer systems and in some embodiments, formatting information 174 can be obtained from a remote source via the communications interface 115.

The memory system 112 is any type of computer readable medium and in this example is encoded with a content formatting application 140-1. The content formatting application 140-1 may be embodied as software code such as data and/or logic instructions (e.g. code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the content formatting application 140-1. Execution of content formatting application 140-1 in this manner produces processing functionality in a content formatting process 140-2. In other words, the content formatting process 140-2 represents one or more portions of runtime instances of the content formatting application 140-1 (or the entire application 140-1) performing or executing within or upon the processor 113 in the computerized device 110 at runtime.

According to the general operation of the system shown in FIG. 1, the content formatting process 140 receives identified content 172, and identifies, within the original document 170, formatting information 174 that is associated with the identified content 172. The formatting process 140 applies the formatting information 174 to the identified content 172, creating a revised document 180 that contains the identified content 172 properly formatted with the formatting information 174 that was associated with the identified content 172 in the original document 170. Further details of configurations explained herein will now be provided with respect to a flow chart of processing steps that show the high level operations disclosed herein to perform the content formatting process.

Figure 2:
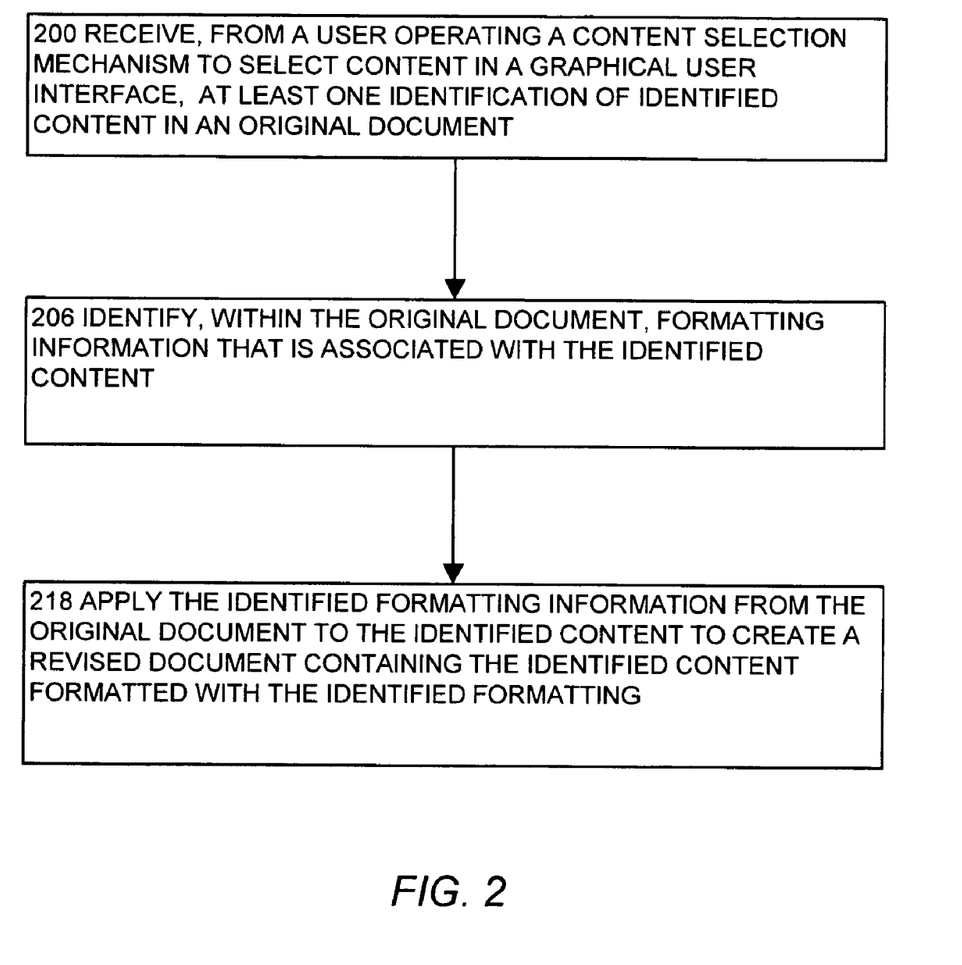
FIG. 2 illustrates a flowchart of a procedure performed by the system of FIG. 1, when the content formatting process receives identification of content in an original document, according to one embodiment disclosed herein.

FIG. 2 is a flowchart of the steps performed by the content formatting process 140 to identify formatting information 174 for the identified content 172 within an original document 170. The content formatting process 140 associates the identified formatting information 174 with the identified content 172. When a revised document 180 is created with the identified content 172, the formatting information 174 is properly formatted with the formatting information 174.

In step 200, the content formatting process 140 receives at least one identification of content in an original document 170. This can be a user highlighting a portion of the text, and performing the 'copy' or 'cut' function. The details of the content formatting process 140 receiving the identified content 172 will be explained further within the sub steps of 201 through 205.

In step 206 the content formatting process 140 identifies, within the original document 170, formatting information 174 that is associated with the identified content 172. The formatting information 174 can be contained within the original document 170, or another, separate document. The formatting information 174 can be any type of formatting and a user can specify default values. For example, header and/or footer information may be considered to be formatting information that is associated with the identified content 172, even though header and footer information is not displayed within the identified content and is maintained elsewhere within the document. Other examples of formatting information 174 that can be identified by the system disclosed herein include paragraph information, shading details, background color, text color, image locations, and so forth. The details of the location of the formatting information 174 will be explained further within the sub steps of 207 through 222.

In step 218 the content formatting process 140 applies the identified formatting information 174 from the original document 170 to the identified content 172 to create a revised document 180 containing the identified content 172 formatted with the identified formatting information 174. The revised document 180 now has the identified content 172 formatted the same way it appeared within the original document 170 without the user have to re-format the identified content 172 within the revised document 180.

Figure 3:
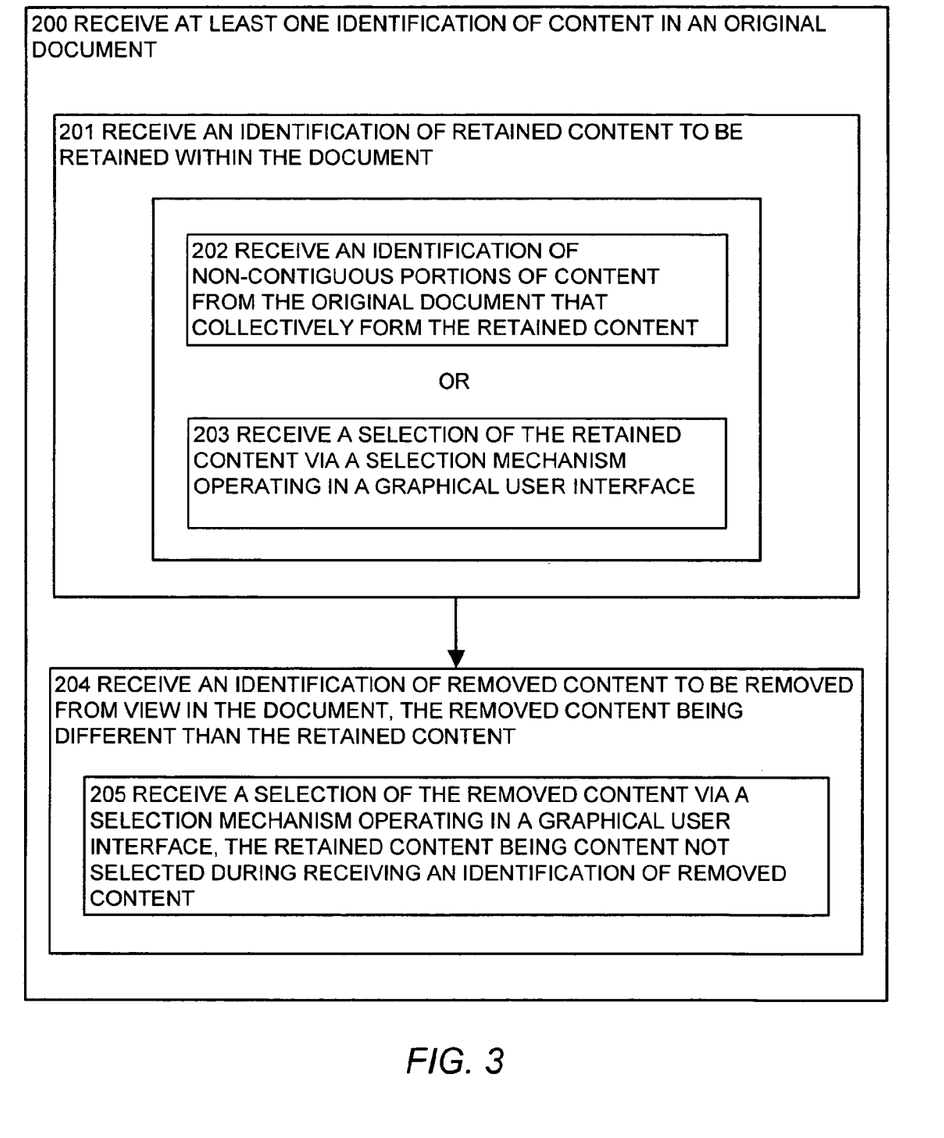
FIG. 3 illustrates a flowchart of a procedure performed by the system of FIG. 1, when the content formatting process receives identification of content in an original document, according to one embodiment disclosed herein.

FIG. 3 is a flowchart of the steps performed by the content formatting process 140 when it receives identification of content in an original document 170. The user may want to select portions of the original document 170 to be retained, creating a revised document 180, by deleting any portions not selected to be part of the revised document 180.

In step 201, the content formatting process 140 receives an identification of retained content to be retained within the document. In one scenario, the identified content 172 could be the content the user wishes to retain, while the remaining content is deleted from the original document 170. The details of the retained content will be explained further within the sub steps of 202 and 203.

In step 202, the content formatting process 140 receives an identification of non-contiguous portions of identified content 172 from the original document 172 that collectively form the retained content. This allows the user to identify several sections of the document that are to be retained.

In step 203, the content formatting process 140 receives a selection of the retained content via a selection mechanism operating in the graphical user interface 160. In the case of a word processor or web page editor, this could be right clicking a mouse and choosing from the menu that appears on the graphical user interface 160, or using short cut keystrokes, such as "CTRL-C".

In step 204, the content formatting process 140 receives an identification of removed content to be removed from view in the document, the removed content being different than the retained content. In one scenario, the identified content 172 could be the content the users wishes to delete, while retaining the content that is different from the identified content 172. The details of the content to be removed will be explained further within the sub step of 205.

In step 205, the content formatting process 140 receives a selection of the removed content via a selection mechanism operating in the graphical user interface 160, the retained content being content not selected during receiving an identification of removed content. In the case of a word processor or web page editor, this could be right clicking a mouse and choosing from the menu which appears on the graphical user interface 160, or using short cut keystrokes, such as "CTRL-C".

Figure 4:
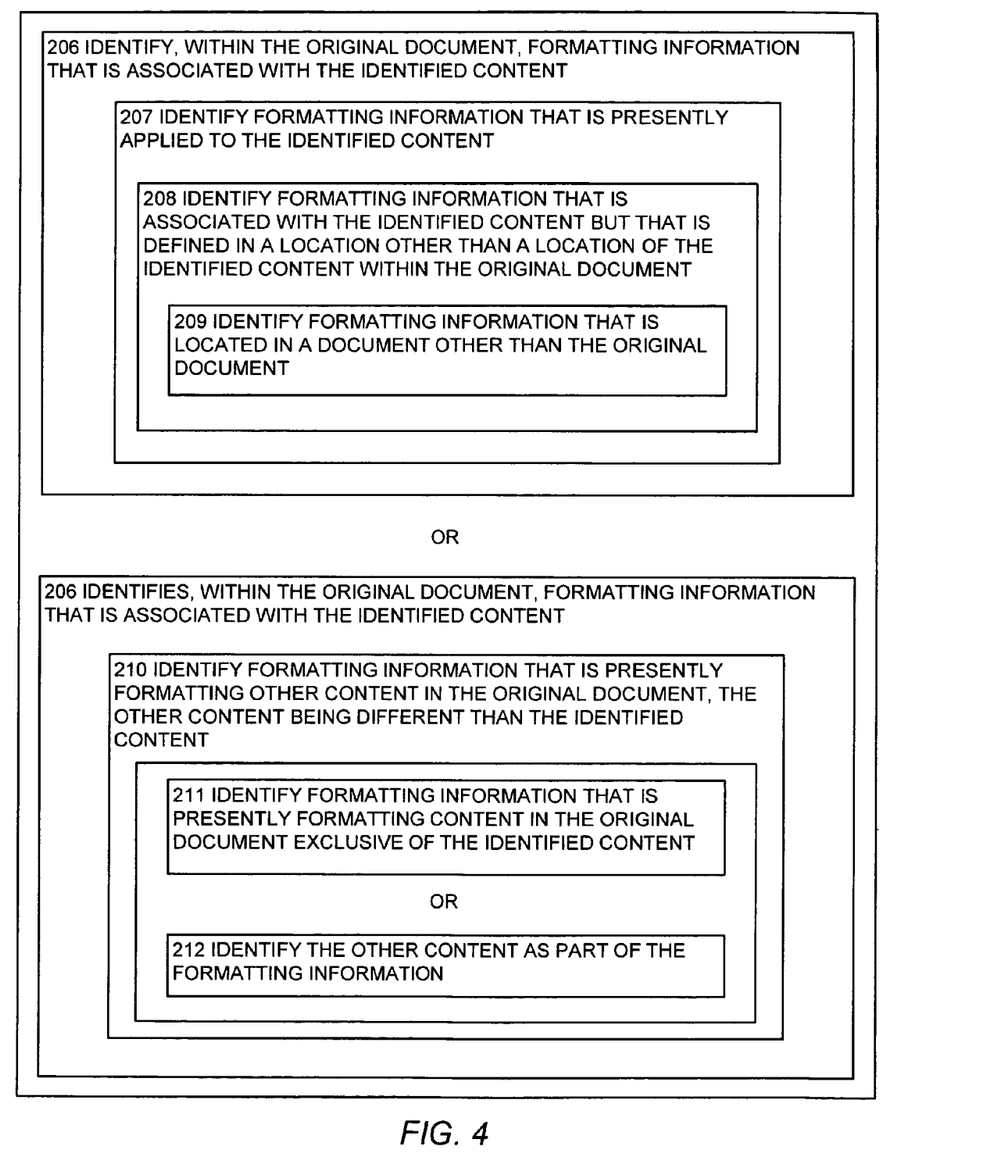
FIG. 4 illustrates a flowchart of a procedure performed by the system of FIG. 1, when the content formatting process identifies, within the original document, formatting information that is associated with the identified content, according to one embodiment disclosed herein.

FIG. 4 is a flowchart of the steps performed by the content formatting process 140 when it identifies, within the original document 170, formatting information 174 that is associated with the identified content 172. The formatting information 174 that is applied to the identified content 172 can be defined within the original document 170 or another document.

In step 207, the content formatting process 140 identifies formatting information 174 that is presently applied to the identified content 172. The formatting information 174 could format the characters of text, or could structure the paragraph in which the identified content 172 exists, or even format the original document 170 in which the identified content 172 exists. The formatting information can include a page layout of the document, such as text or other content contained within columns, sidebars, or captions contained within the page.

In step 208, the content formatting process 140 identifies formatting information 174 that is associated with the identified content 172, but that is defined in a location other than a location of the identified content 172 within the original document 170. For example, a web page might have formatting information 174 that specifies the font size and color of the identified content 172, defined at the top of the original document 170. Alternatively, the web page may have a title or a border or other information that generally formats the page, but that is defined outside of the scope or location of the actual identified content.

In step 209, the content formatting process 140, identifies formatting information 174 that is located in a document other than the original document 170. For example, a web page, might have formatting information 174 contained within a Cascading Style Sheet (CSS), not the original document 170, but included, by reference, within the original document 170.

Alternatively, in step 210, the content formatting process 140 identifies formatting information 174 that is presently formatting other content in the original document 170, the other content being different than the identified content 172. The details of formatting information 174 identified as being associated with other content not selected as identified content 172 will be explained further within the sub steps of 211 and 212.

In step 211, the content formatting process 140 identifies formatting information 174 that is presently formatting content in the original document 170 exclusive of the identified content 172. For example, the portion of identified content 172 selected by the user within a word processor could contain formatting information pertaining to content not part of the identified content 172.

Alternatively, in step 212, the content formatting process 140 identifies the other content as part of the formatting information 174. In this example, the formatting information can include identifying some content within the document that is to be "carried over" other than that actual identified (e.g. user selected) content 172. As an example, if a graphic were located nearby the identified content 172 (e.g. within a certain physical distance, or directly before or after the identified content 172), the content formatting process 140 can be configured to identify the graphic and can apply (i.e., paste) the graphic along with the identified content 172 into the revised document. As another example, if the document had a title, the content formatting process 140 can be configured to recognize the existence of the title as part of the formatting information 174 and carry this over with the identified content 172 when identifying and applying the formatting information 174.

Figure 5:
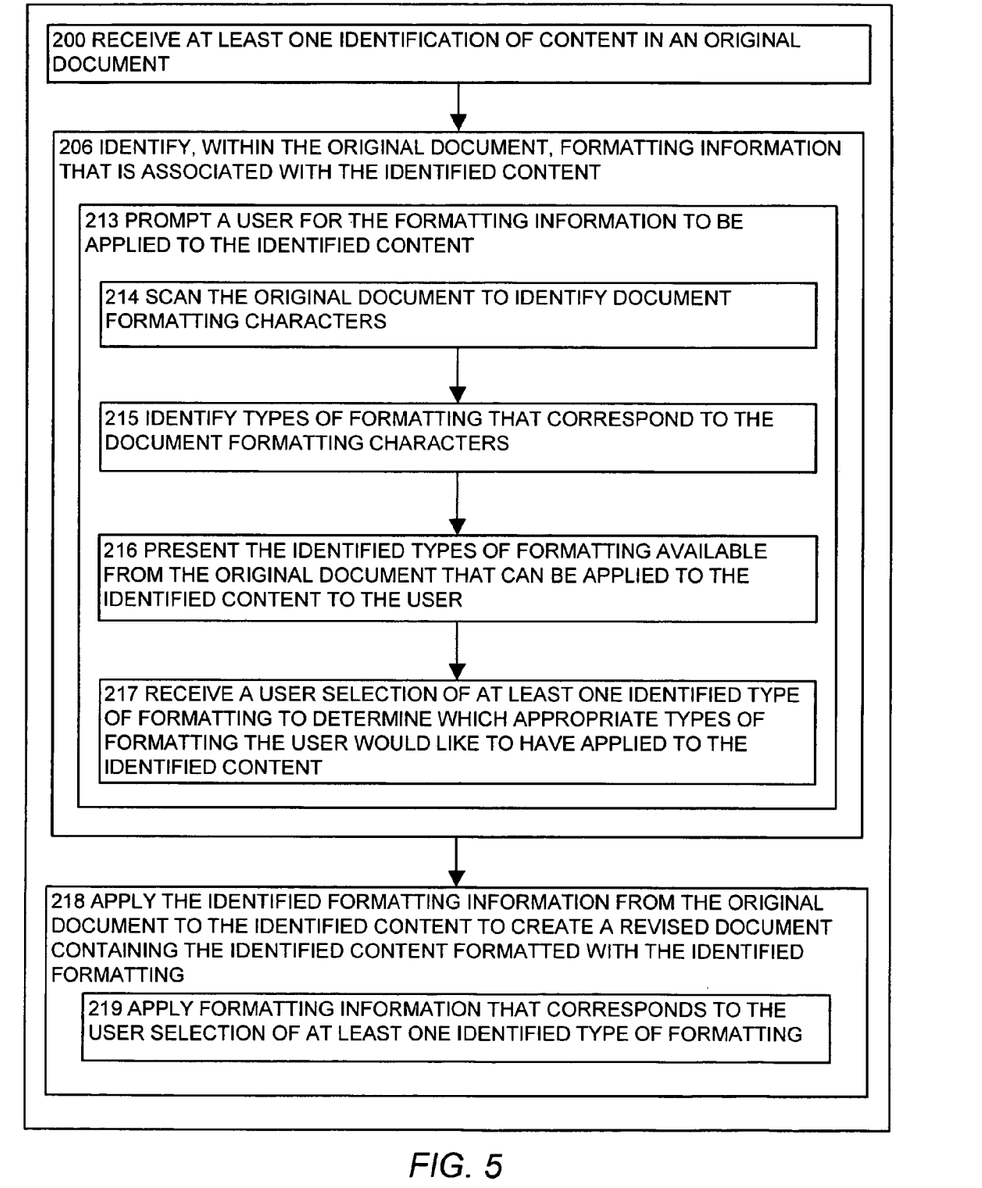
FIG. 5 illustrates a flowchart of a procedure performed by the system of FIG. 1, when the content formatting process receives identification of content in an original document, according to one embodiment disclosed herein.

FIG. 5 is a flowchart of the steps performed by the content formatting process 140 when it prompts the user form formatting information 174 to be applied to the identified content 172 when creating the revised document 180. Identified content 172 can have multiple types of formatting information 174, some of which the user wants transferred to the revised document 180, and some of which the user does not want to be transferred to the revised document 180. The details of prompting the user for formatting information 174 will be explained further within the sub steps of 213 through 217.

In step 213, the content formatting process 140 prompts a user for the formatting information 174 to be applied to the identified content 172. For example, the user might want the paragraph formatting information to be transferred over to the revised document 180, but not the font color, or font size of the text. The details of prompting the user for formatting information 174 will be explained further within the sub steps of 214 through 217.

In step 214, the content formatting process 140 scans the original document to identify document formatting characters. This distinguishes the content of the original document 170 from formatting information 174 associated with the original document 170.

In step 215, the content formatting process 140 identifies types of formatting that correspond to the document formatting characters. Some of the document formatting characters pertain to formatting the text (i.e. font, font size, text color, etc), document (i.e. background color, etc), or structures within the document (i.e. tables, frames, etc).

In step 216, the content formatting process 140 presents, to the user, the identified types of formatting available from the original document 170 that can be applied to the identified content 172. The user decides which of the identified types of formatting information 174 should be applied to the identified content 172 that will create the revised document 180.

In step 217, the content formatting process 140 receives a user selection of at least one identified type of formatting to determine which appropriate types of formatting the user would like to have applied to the identified content when creating the revised document 180.

In step 219, the content formatting process 140 applies formatting information 174 that corresponds to the user selection of at least one identified type of formatting to the identified content 172. The identified content 172 with the chosen formatting information 174 applied, is used to create the revised document 180.

Figure 6:
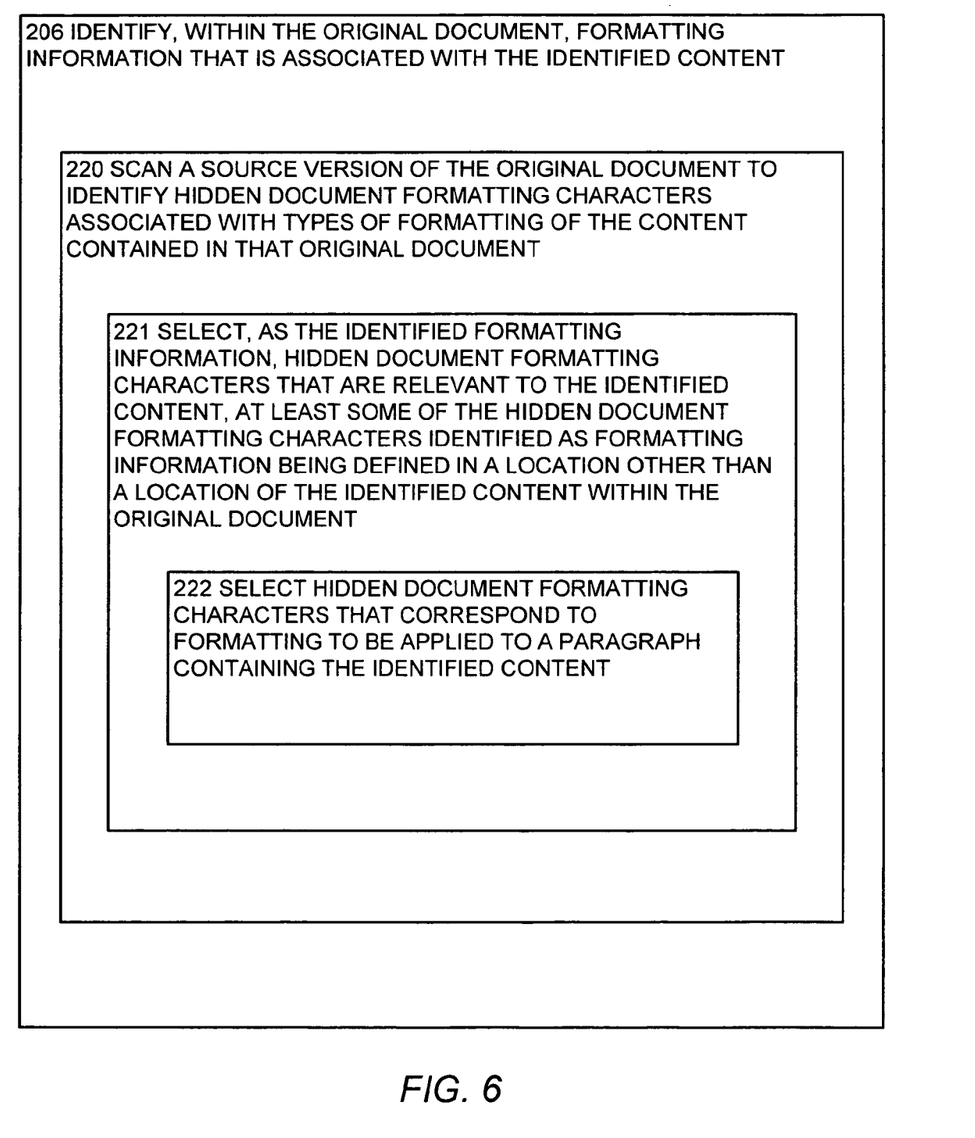
FIG. 6 illustrates a flowchart of a procedure performed by the system of FIG. 1, when the content formatting process identifies, within the original document, formatting information that is associated with the identified content, according to one embodiment disclosed herein.

FIG. 6 is a flowchart of the steps performed by the content formatting process 140 when it identifies, within the original document 170, formatting information 174 that is associated with the identified content 172. A source of the original document 180 is scanned to identify invisible document formatting characters, and the relevant document formatting characters are selected to be applied to the identified content 172 when creating the revised document 180.

In step 220, the content formatting process 140 scans a source version of the original document 170 to identify hidden document formatting characters associated with types of formatting of the content contained in that original document 170. The scanning process parses the source version of the document looking for patterns related to document formatting characters.

In step 221, the content formatting process 140 selects, as the identified formatting information, hidden document formatting characters that are relevant to the identified content 172, at least some of the hidden document formatting characters identified as formatting information being defined in a location other than a location of the identified content 172 within the original document 170. This location can be within the original document 170, or in a separate document referenced by the original document 170.

In step 222, the content formatting process 140 selects hidden document formatting characters that correspond to formatting to be applied to a paragraph containing the identified content 172. When the identified content 172 with the hidden document formatting characters applied is transferred to the revised document 180, the identified content 172 is formatted properly, as it was within the original document 170.

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. A method in which at least one computer system accesses instructions from computer storage and executes the instructions to perform steps comprising:
   receiving a selection of content displayed in a first portion of a first document;
   identifying a reference in the first document to first formatting information currently applied to the selected content;
   identifying second formatting information in the first portion of the first document that currently formats non-selected content displayed in a second portion of the first document, the non-selected content exclusive of the selected content;
   including an identification of the non-selected content in the first formatting information;
   upon receiving a request to paste the selected content into a second document, pasting the selected content into the second document, the selected content formatted in the second document according to the first formatting information;
   based on the identification of the non-selected content in the first formatting information, carrying over the non-selected content from the first document into the second document;
   wherein identifying the reference in the first document includes:
   identifying a reference to a source located outside of the first document, the source providing the first formatting information currently applied to the selected content;
   accessing the first formatting information from the source;
   displaying the first formatting information via a prompt;
   receiving a selection of a subset of the first formatting information;
   wherein pasting the selected content into the second document includes: formatting the selected content according to the subset of the first formatting information;
   wherein including the identification of the non-selected content in the first formatting information includes: including, in the subset of the first formatting information, an identification of: (i) a displayed first document title and (ii) a graphic located, in the first document, within a particular distance from the selected content; and
   wherein carrying over the non-selected content includes:
   pasting the graphic in the second document; and
   pasting the first document title as a title of the second document.

2. The method as in claim 1, wherein the first document comprises a web page; and
   wherein the reference to the source outside the first document comprises a reference to a Cascading Style Sheet, the Cascading Style Sheet located external to the web page.

3. The method as in claim 1, wherein receiving the selection of a subset of the first formatting information includes:

receiving a user selection applied in response to the prompt, the user selection indicating which part of the first formatting information to apply to the selected content upon pasting the selected content into the second document.

4. A computer readable storage medium comprising executable instructions encoded thereon operable on a computerized device, the instructions comprising:
  instructions for receiving a selection of content displayed in a first portion of a first document;
  instructions for identifying a reference in the first document to first formatting information currently applied to the selected content;
  instructions for identifying second formatting information in the first portion of the first document that currently formats non-selected content displayed in a second portion of the first document, the non-selected content exclusive of the selected content;
  instructions for including an identification of the non-selected content in the first formatting information;
  instructions for pasting the selected content into the second document upon receiving a request to paste the selected content into a second document, the selected content formatted in the second document according to the first formatting information; and
  instructions for carrying over the non-selected content from the first document into the second document based on the identification of the non-selected content in the first formatting information;
  wherein the instructions for identifying the reference in the first document include:
  instructions for identifying a reference to a source located outside of the first document, the source providing the first formatting information currently applied to the selected content;
  instructions for accessing the first formatting information from the source;
  instructions for displaying the first formatting information via a prompt;
  instructions for receiving a selection of a subset of the first formatting information;
  wherein the instructions for pasting the selected content into the second document include:
  instructions for formatting the selected content according to the subset of the first formatting information;
  wherein the instructions for including the identification of the non-selected content in the first formatting information include: instructions for including, in the subset of the first formatting information, an identification of: (i) a displayed first document title and (ii) a graphic located, in the first document, within a particular distance from the selected content; and
  wherein the instructions for carrying over the non-selected content include:
  instructions for pasting the graphic in the second document; and
  instructions for pasting the first document title as a title of the second document.

5. The computer readable storage medium as in claim 4, wherein the first document comprises a web page; and
  wherein the reference to the source outside the first document comprises a reference to a Cascading Style Sheet, the Cascading Style Sheet located external to the web page.

6. The computer readable storage medium as in claim 4, wherein the instructions for receiving the selection of a subset of the first formatting information include:
  instructions for receiving a user selection applied in response to the prompt, the user selection indicating which part of the first formatting information to apply to the selected content upon pasting the selected content into the second document.

7. A computer system comprising:
  a processor;
  a memory unit that stores instructions associated with an application executed by the processor; and
  an interconnect coupling the processor and the memory unit, enabling the computer system to execute the application and perform operations of:
  receiving a selection of content displayed in a first portion of a first document;
  identifying a reference in the first document to first formatting information currently applied to the selected content;
  identifying second formatting information in the first portion of the first document that currently formats non-selected content displayed in a second portion of the first document, the non-selected content exclusive of the selected content;
  including an identification of the non-selected content in the first formatting information;
  upon receiving a request to paste the selected content into a second document, pasting the selected content into the second document, the selected content formatted in the second document according to the first formatting information;
  based on the identification of the non-selected content in the first formatting information, carrying over the non-selected content from the first document into the second document;
  wherein identifying the reference in the first document includes:
  identifying a reference to a source located outside of the first document, the source providing the first formatting information currently applied to the selected content;
  accessing the first formatting information from the source;
  displaying the first formatting information via a prompt;
  receiving a selection of a subset of the first formatting information;
  wherein pasting the selected content into the second document includes: formatting the selected content according to the subset of the first formatting information;
  wherein including the identification of the non-selected content in the first formatting information includes: including, in the subset of the first formatting information, an identification of: (i) a displayed first document title and (ii) a graphic located, in the first document, within a particular distance from the selected content; and
  wherein carrying over the non-selected content includes:
  pasting the graphic in the second document;
  pasting the first document title as a title of the second document.

* * * * *